US012669831B2

(12) United States Patent
Li et al.

(10) Patent No.: US 12,669,831 B2
(45) Date of Patent: Jun. 30, 2026

(54) OBSTACLE AVOIDANCE METHOD AND RELATED APPARATUSES FOR MOVING DEVICE

(71) Applicant: Telesair, Inc., Irvine, CA (US)

(72) Inventors: Hanlun Li, San Diego, CA (US); Xiaofeng Lei, Irvine, CA (US)

(73) Assignee: Telesair, Inc., Irvine, CA (US)

( * ) Notice: Subject to any disclaimer, the term of this patent is extended or adjusted under 35 U.S.C. 154(b) by 92 days.

(21) Appl. No.: 18/676,903

(22) Filed: May 29, 2024

(65) Prior Publication Data

US 2025/0370467 A1     Dec. 4, 2025

(51) Int. Cl.
*G05D 1/622*     (2024.01)
*G05D 1/65*     (2024.01)
*G05D 1/686*     (2024.01)

(52) U.S. Cl.
CPC .............. *G05D 1/622* (2024.01); *G05D 1/65* (2024.01); *G05D 1/686* (2024.01)

(58) Field of Classification Search
CPC ........... G05D 1/622; G05D 1/65; G05D 1/686
See application file for complete search history.

(56) References Cited

U.S. PATENT DOCUMENTS 5,570,285 A * 10/1996 Asaka ................... G05D 1/0214
                                                                 180/169
2016/0041266 A1 * 2/2016 Smits ....................... G01S 17/66
                                                                 356/5.01

2020/0033857 A1 * 1/2020 Yu ........................... H04W 4/38
2020/0284883 A1 * 9/2020 Ferreira ................. G01S 7/4815
2021/0107159 A1 * 4/2021 Goto ...................... B25J 9/1664
2022/0048188 A1 * 2/2022 Song ...................... B25J 9/1676
2023/0008482 A1 * 1/2023 Yang ...................... G05D 1/028
2025/0181075 A1 * 6/2025 Lynn ...................... G05D 1/686

FOREIGN PATENT DOCUMENTS

CN          106843223 A  * 6/2017 ............. B62D 63/02
CN          108829137 A  * 11/2018 ............. G01S 15/93
CN          121143451 A  * 12/2025
WO   WO-2018077306 A1 *  5/2018 ........... G05D 1/0246
WO   WO-2024175038 A1 *  8/2024 ............. G05D 1/633

OTHER PUBLICATIONS

Kong et al.; Person Following with Dynamic Obstacle Avoidance; Proceedings of The 2023 IEEE International Conference on Real-time Computing and Robotics Jul. 17-20, 2023, Datong, China (Year: 2023).*

* cited by examiner

*Primary Examiner* — Fadey S. Jabr
(74) *Attorney, Agent, or Firm* — Maier & Maier, PLLC

(57)     ABSTRACT

An obstacle avoidance method and related apparatuses. The obstacle avoidance method includes: determining, based on a measurement from each of sensing devices in a first sensing set, an initial turning angle for the moving device to follow a target, where each of the sensing devices is opera-tively coupled to the moving device, and the measurement is indicative of information of at least one object within a measuring range of each of the sensing devices; determining whether there is an obstacle in a direction of the initial turning angle; and obtaining an adjusted turning angle of which direction has no obstacle based on a determination of the obstacle in the direction of the initial turning angle.

18 Claims, 6 Drawing Sheets

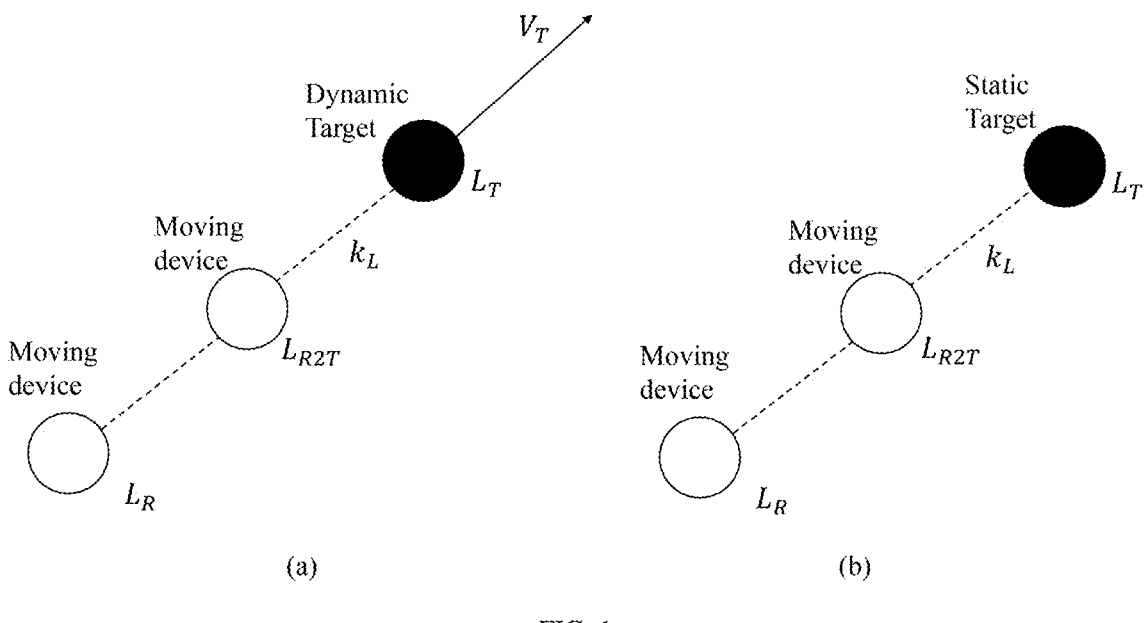

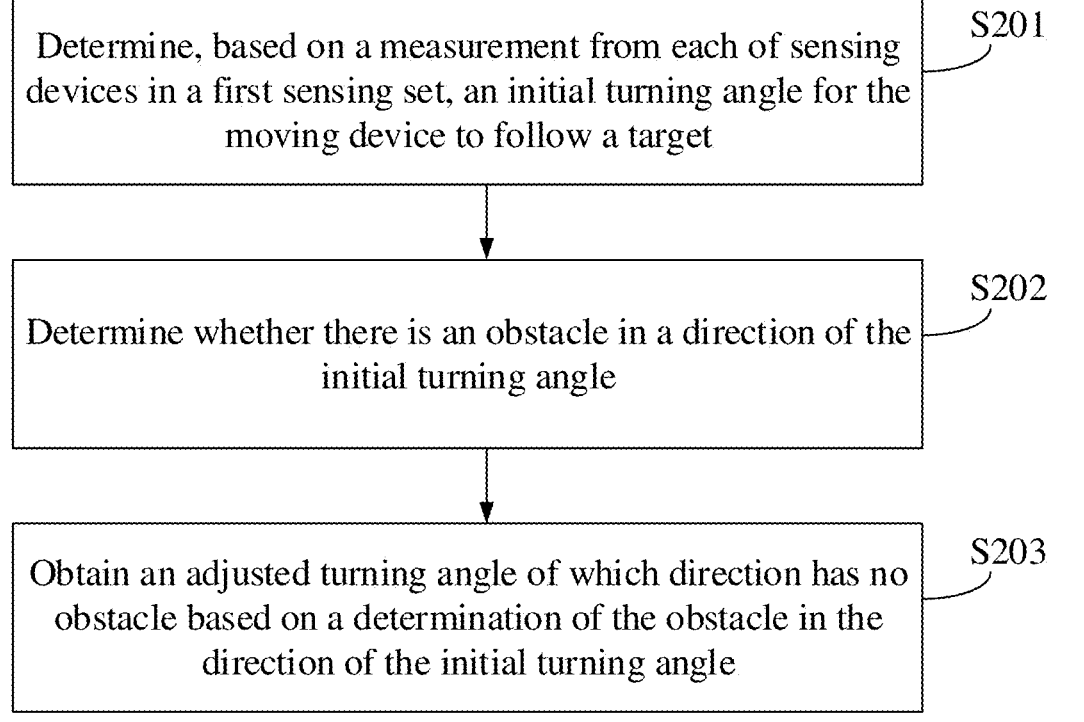

Determine, based on a measurement from each of sensing devices in a first sensing set, an initial turning angle for the moving device to follow a target — S201

Determine whether there is an obstacle in a direction of the initial turning angle — S202

Obtain an adjusted turning angle of which direction has no obstacle based on a determination of the obstacle in the direction of the initial turning angle — S203

FIG. 2

O Moving device          Boundary          Sensing device

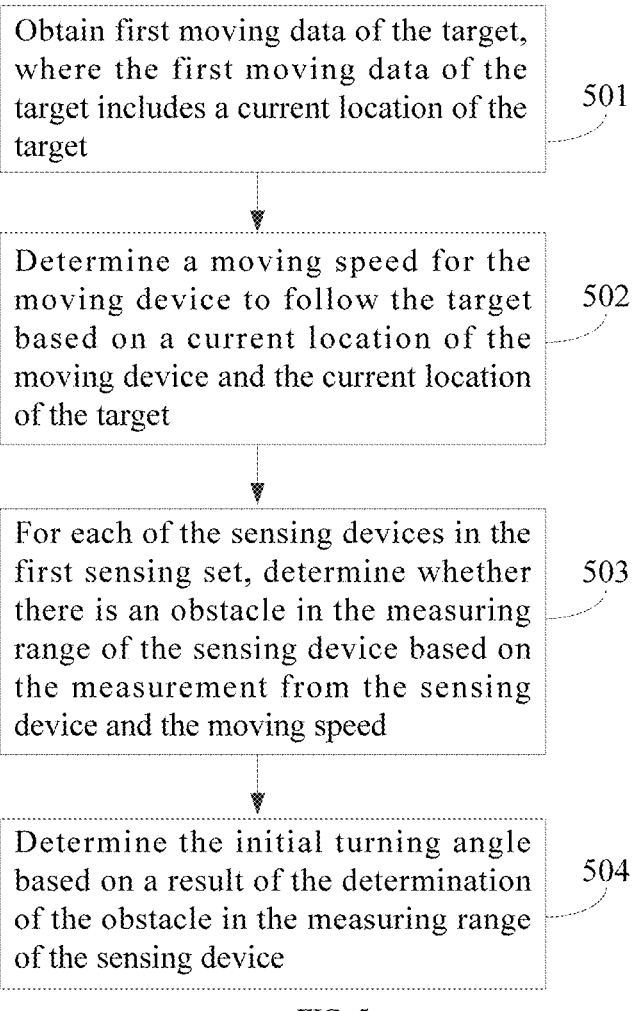

| Obtain first moving data of the target, where the first moving data of the target includes a current location of the target | 501 |

| Determine a moving speed for the moving device to follow the target based on a current location of the moving device and the current location of the target | 502 |

| For each of the sensing devices in the first sensing set, determine whether there is an obstacle in the measuring range of the sensing device based on the measurement from the sensing device and the moving speed | 503 |

| Determine the initial turning angle based on a result of the determination of the obstacle in the measuring range of the sensing device | 504 |

FIG. 5

OBSTACLE AVOIDANCE METHOD AND RELATED APPARATUSES FOR MOVING DEVICE

TECHNICAL FIELD

The present disclosure relates to the field of obstacle avoidance technologies and, in particular, to an obstacle avoidance method for a moving device and related apparatuses.

BACKGROUND

Moving devices may follow a target at a certain distance therebetween and speed by using some technologies such as wireless wave communication, ultrasonic sensing, radar positioning, and so on. However, the moving device may encounter obstacles in the process of following the target, which leads to being blocked by obstacles and unable to continue following. Therefore, there is a need for an obstacle avoidance method for the moving device.

This background information is provided to reveal information believed by the applicant to be of possible relevance to the present disclosure. No admission is necessarily intended, nor should be construed, that any of the preceding information constitutes prior art against the present disclosure.

SUMMARY

This disclosure provides an obstacle avoidance method for a moving device and related apparatuses. According to the method and related apparatuses, the moving device can realize accurate automatic obstacle avoidance in the process of following a target, which realizes the following of a specific target and improves the safety of the moving device.

In a first aspect, an embodiment of the present disclosure provides an obstacle avoidance method for a moving device, and the method includes:

determining, based on a measurement from each of sensing devices in a first sensing set, an initial turning angle for the moving device to follow a target, where each of the sensing devices is operatively coupled to the moving device, and the measurement is indicative of information of at least one object within a measuring range of each of the sensing devices;

determining whether there is an obstacle in a direction of the initial turning angle; and obtaining an adjusted turning angle of which direction has no obstacle based on a determination of the obstacle in the direction of the initial turning angle.

In a second aspect, an embodiment of the present disclosure provides a moving device, including:

a processor and a memory stored with instructions, where the processor is configured to call and run the instructions stored in the memory to execute operations of:

determining, based on a measurement from each of sensing devices in a first sensing set, an initial turning angle for the moving device to follow a target, where each of the sensing devices is operatively coupled to the moving device, and the measurement is indicative of information of at least one object within a measuring range of each of the sensing devices;

determining whether there is an obstacle in a direction of the initial turning angle; and obtaining an adjusted turning angle of which direction has no obstacle based on a determination of the obstacle in the direction of the initial turning angle.

In a third aspect, an embodiment of the present disclosure provides a moving apparatus, and the moving apparatus includes:

a processing module, configured to:

determine, based on a measurement from each of sensing devices in a first sensing set, an initial turning angle for the moving apparatus to follow a target, wherein each of the sensing devices is operatively coupled to the moving apparatus, and the measurement is indicative of information of at least one object within a measuring range of each of the sensing devices;

determine whether there is an obstacle in a direction of the initial turning angle; and obtain an adjusted turning angle of which direction has no obstacle based on a determination of the obstacle in the direction of the initial turning angle.

In a fourth aspect, an embodiment of the present disclosure provides a computer-readable storage medium, which stores therein computer-executable instructions that, when being executed by one or more processors, implement the obstacle avoidance method according to the first aspect.

In a fifth aspect, an embodiment of the present disclosure provides a computer program, when the computer program is executed by one or more processors, implements the obstacle avoidance method according to the first aspect.

In a sixth aspect, an embodiment of the present disclosure provides a computer program product, which stores thereon computer-executable instructions which, when being executed by one or more processors, implements the obstacle avoidance method according to the first aspect.

It should be understood that the content described in this section is not intended to identify the key or important features of the embodiments of the present disclosure, nor to limit the scope of the present disclosure. Other features of the present disclosure will be easily understood through the following description.

BRIEF DESCRIPTION OF THE DRAWINGS

The drawings are used for a better understanding of the present solution but do not constitute any limitation on the present disclosure. Throughout the drawings, identical or similar reference numbers designate identical or similar elements.

FIG. 1 is an exemplary schematic diagram of a scenario where a moving device follows a target according to an embodiment of the present disclosure.

FIG. 2 is a schematic flowchart of an obstacle avoidance method for a moving device according to an embodiment of the present disclosure.

FIG. 5 is a schematic flowchart of a process for determining an initial turning angle according to an embodiment of the present disclosure.

DETAILED DESCRIPTION OF THE EMBODIMENTS

Figure 3:
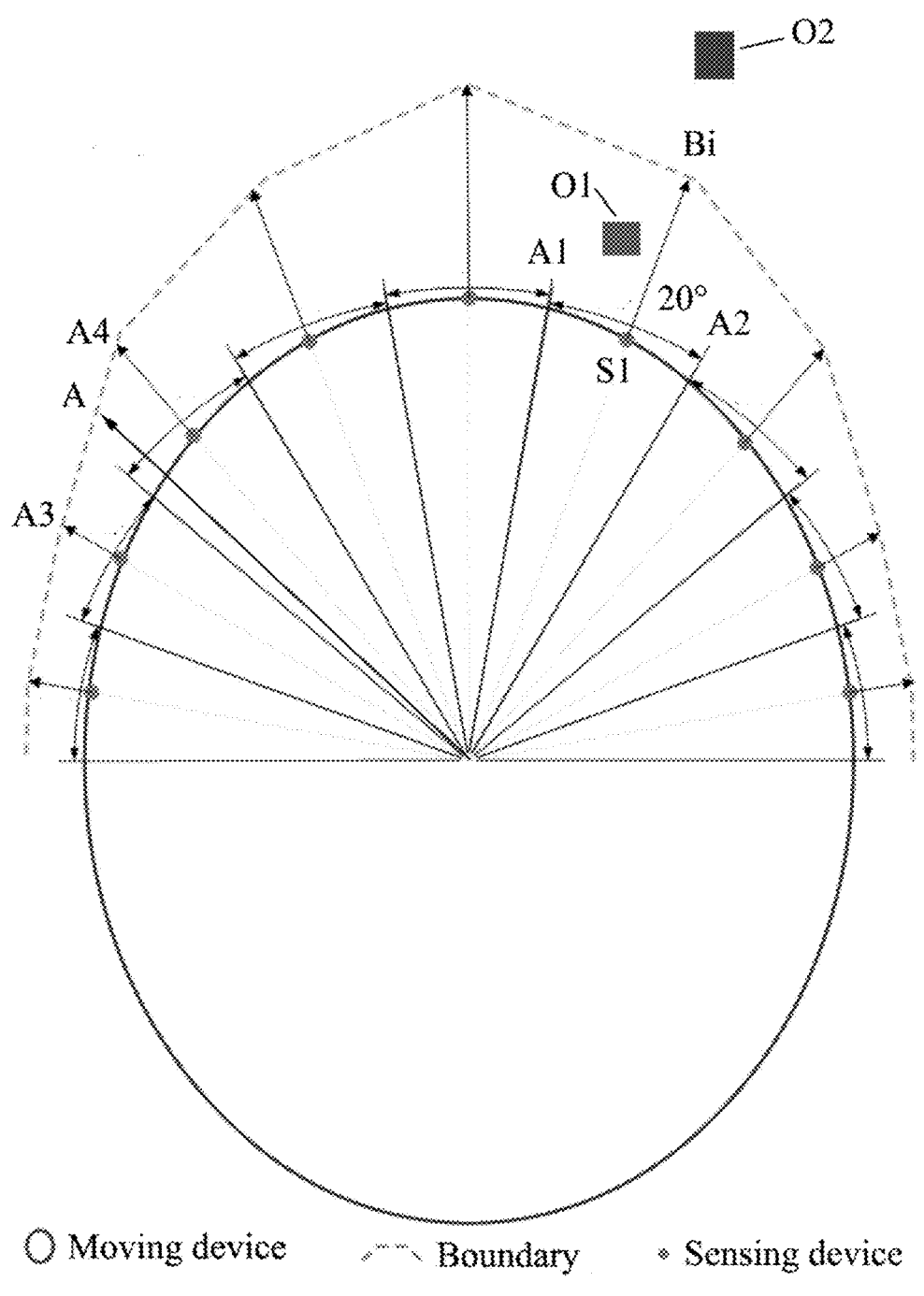
FIG. 3 is a schematic diagram of a layout of sensing devices in a first sensing set provided on a moving device.

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and include structural or logical changes not depicted in the figures. The following detailed description, therefore, is not to be taken in a limiting sense, and the scope of the present disclosure is defined by the appended claims.

The terminology used in the embodiments of the present disclosure is merely intended for describing specific embodiments and is not intended to limit the present disclosure. The singular forms "a", "said" and "the" as used in the embodiments and the appended claims of the present disclosure are intended to include the plural forms as well, and unless the context clearly indicates other meaning, "a plurality of" generally includes at least two, but it does not exclude the case of including at least one.

Depending on the context, the expression "if", "in a case of", or "in a case that" as used herein may be interpreted as "upon . . . ", "when . . . ", or "in response to determining . . . " or "in response to detecting . . . ". Similarly, depending on the context, the phrase "if it is determined that . . . " or "if it is detected that (a stated condition or event)" may be interpreted as "when determining that . . . " or "in response to determining . . . ", or "when detecting (a stated condition or event)" or "in response to detecting (a stated condition or event)".

It should also be noted that the terms "including", "comprising" or any other variations thereof are intended to cover non-exclusive inclusions, such that goods or systems including a series of elements include not only those elements, but also other elements not expressly listed, or elements inherent to the goods or systems. Without more restrictions, an element defined by the phrase "including a" does not exclude the existence of other identical elements in the goods or systems that include the element.

It should be noted that concepts such as "first", and "second" mentioned in the present disclosure are merely used to distinguish different apparatuses, modules, or units, but not to limit the sequence or interdependency of functions executed by these apparatuses, modules, or units.

In addition, the sequence of steps in the following method embodiments is merely intended for an example and is not strictly limited.

In the process of following a target, a moving device (e.g., a robot, an unmanned aerial vehicle, etc.) usually determines a turning angle according to a current location of the target, and then directly turns at the determined turning angle to follow the target. However, there may be an obstacle in a direction of the determined turning angle, which may lead to a problem of being blocked by the obstacle and failing to continue following the target or may lead to collision with the obstacle which would possibly cause damage to the moving device.

In view of the above problem, the present disclosure provides an obstacle avoidance method for a moving device and related apparatuses. According to the method and related apparatuses, the moving device can realize accurate automatic obstacle avoidance in the process of following a target, thereby the following of a specific target is realized and the safety of the moving device is ensured.

Before elaborating on the embodiments of the present disclosure, an exemplary scenario to which the embodiments are applicable will be described in the first place.

FIG. 1 is an exemplary schematic diagram of a scenario where a moving device follows a target according to an embodiment of the present disclosure, in which figure (a) depicts a scenario where a moving device follows a dynamic target, and figure (b) depicts a scenario where a moving device follows a static target.

In FIG. 1, the moving device follows the target at a certain distance $k_L$ therebetween. Specifically, the moving device moves from a current location $L_R$ to a target location $L_{R2T}$ for the moving device to follow the target (i.e., a location that the moving device moves to) and remains the certain distance $k_L$ between the target location $L_{R2T}$ of the moving device and a current location $L_T$ of the target. That is, the distance $k_L$ between the target location $L_{R2T}$ of the moving device and the current location $L_T$ of the target may satisfy the following equation:

$$|L_T - L_{R2T}| = k_L \qquad (1)$$

where $k_L$ represents an adjustable experimental constant for determining a safe range between the moving device and the target while the moving device follows the target after reaching the target location $L_{R2T}$.

The current location $L_R$ of the moving device refers to the location of the moving device at the moment, and the current location $L_T$ of the target refers to the location of the target currently sensed by the moving device simultaneously. The moving device can obtain the current location of the target in many ways, e.g., by virtue of ultrasonic positioning, Bluetooth positioning, Wi-Fi positioning, radio frequency identification (RFID) positioning, global positioning system (GPS) positioning, and ultra-wide band (UWB) positioning technologies. In an implementation, the moving device obtains the current location $L_T$ of the target with the UWB positioning technology, for example, the moving device may be capable of sending signals to a UWB label provided on the target and obtain the current location of the target according to a signal returned from the UWB label. Additional details regarding obtaining location information of the target with the UWB positioning technology in the present disclosure are well-known to those skilled in the art. As such, these details are omitted here. In an implementation, the moving device can be provided with a location sensor to obtain its current location $L_R$ by the location sensor. In an implementation, the moving device can obtain its current location by monitoring its velocity relative to an initial reference point.

As shown in figure (a) of FIG. 1, in a case that the target is dynamic, that is, a velocity $V_T$ of the target is not zero, the target location $L_{R2T}$ of the moving device is in the opposite direction of the velocity $V_T$ of the target with regard to the current location $L_T$ of the target. It should be noted that for the dynamic case, the current location $L_R$ of the moving device in figure (a) of FIG. 1 is shown to be in the opposite direction of the velocity $V_T$, however, such position is illustrative rather than restrictive, depending on actual applications, the current location $L_R$ of the moving device could be, e.g., not on the opposite direction of the velocity $V_T$, but at other position, which is not limited in the embodiments of the present disclosure. As shown in figure (b) of FIG. 1, in a case that the target is static, that is, the velocity $V_T$ of the target is zero, the target location $L_{R2T}$ of the moving device is in the same direction of the current location $L_T$ of the target with regard to the current location $L_R$ of the moving device. That is, the moving device may be always behind the target. In an implementation, the moving device can obtain the velocity $V_T$ of the target by UWB positioning technology, details are omitted here for brevity.

The target may be a person, another device (for example, another moving device or a device located at a certain place), and so on, which will not be limited in the present disclosure. The moving device may be a following robot. In an implementation, the target may be a patient, and the moving device may be a following robot equipped with a medical device that can provide treatment support to the patient. In an implementation, the medical device may be a respiratory device that can provide respiratory support for the patient that the moving device follows. The moving device may also be a moving device for assisting a person in completing other social activities or a moving device equipped with a device to assist a person in completing other social activities, which will not be limited in the present disclosure.

In the process of moving from the current location to the target location, the moving device may encounter obstacles, which may lead to a problem of being blocked by obstacles and failing to continue following the target or may lead to collision with obstacles which would possibly cause damage to the moving device. Facing this problem, the moving device can be provided with sensing devices thereon to detect and avoid the obstacles, and then continue following the target. The type of the sensing devices is not limited in the embodiments of the present disclosure. In an implementation, the sensing device may be an ultrasonic sensor. In an implementation, the sensing device may be other types of sensors that can be used to detect obstacles, such as lidar sensors, infrared sensors, camera sensors, capacitive sensors, and so on.

It should be understood moving data of the moving device and location information of the target described above and below, such as the current location of the moving device, the current location of the target, the target location of the moving device, the velocity of the target, a velocity of the moving device, an initial turning angle, a candidate turning angle, and the like, refer to vectors with attributes of magnitude and direction.

FIG. 2 is a schematic flowchart of an obstacle avoidance method for a moving device according to an embodiment of the present disclosure. The method can be applied to the scenario mentioned above, and more specifically, applied to the moving device to follow the target as shown in FIG. 1. Specifically, the obstacle avoidance method includes the steps as follows.

Step S201, the moving device determines, based on a measurement from each of sensing devices in a first sensing set, an initial turning angle for the moving device to follow a target.

As described above, the moving device can be provided with sensing devices (that is, the sensing devices in the first sensing set in step S201) thereon to detect and avoid the obstacles that may be encountered in the process of moving from the current location (e.g., $L_R$) to the target location (e.g., $L_{R2T}$). In this implementation, each of the sensing devices is operatively coupled to the moving device, and the measurement is indicative of the information of at least one object within a measuring range of each of the sensing devices. That is, each of the sensing devices has a measuring range and can obtain a measurement indicative of the information of at least one object within a measuring range of each of the sensing devices. In an implementation, the type of sensing devices in the first sensing set for sensing obstacles may be different from the type of sensing device provided on the moving device for sensing the target, that is, the moving device can distinguish whether a detected object is a target or an obstacle through measurements from different types of sensing devices. In an implementation, as described with reference to FIG. 1, the sensing devices in the first sensing set may be ultrasonic sensors, or other types of sensors that can be used to detect obstacles, and the sensing device used to position the target may be a UWB sensor, or other types sensors that are different from the type of the sensing devices in the first sensing set and can be used to position the target. In an implementation, the number N of the sensing devices in the first sensing set may be equal to $2 \times n + 1$, where n is a positive integer, for example, n may be 1, 2, 3, 4, . . . , and so on.

Based on the measurement indicative of the information of at least one object within a measuring range of each of the sensing devices in the first sensing set, the moving device can determine the initial turning angle for the moving device to follow the target. In an implementation, the initial turning angle may be an angle for the moving device to avoid obstacle(s) detected by one or more sensing devices in the first sensing set, to follow the target. In an implementation, when the sensing devices in the first sensing set does not detect any obstacles during its scan interval (sensing interval), the initial turning angle may be an angle depending on the current location of the moving device and the current location of the target.

Step S202, the moving device determines whether there is an obstacle in a direction of the initial turning angle.

Step S202 can be described with reference to FIG. 3, which is a schematic diagram of a layout of sensing devices in a first sensing set provided on a moving device.

As shown in FIG. 3, in an implementation, the moving device can be provided with the first sensing set of nine sensing devices, that is, $N = 2 \times n + 1 = 9$, where $n = 4$; the sensing devices in the first sensing set are evenly arranged on the moving device, and each of the sensing devices in the first sensing set has a measuring range of 20°, that is, the angle between a direction of A1 and a direction of A2 is 20 degree, in other words, each of the sensing devices in the first sensing set corresponds to a reference angle, for example, a reference angle between $$-\frac{\pi}{2} \text{ and } \frac{\pi}{2};$$

O1 represents an object within a boundary $B_i$, and O2 represents an object outside the boundary $B_i$; and S1 represents a sensing device in the first sensing set. Here the uniform distribution of the sensing devices around semicircle in the first sensing set is illustrative rather than restrictive.

In an implementation, the moving device can determine whether there is an obstacle in a direction of the initial turning angle corresponding to a sensing device in the first sensing set with the boundary and the measurement from the sensing device in the first sensing set. In an implementation, the boundary $B_i$ can be determined according to at least one of the following: a velocity of the moving device, a location of a sensing device, a shape of the moving device, an environment scan interval of the moving device, or time taken for the moving device to react to the sensing devices' readings (measurements from the sensing devices). In an implementation, the boundary can be defined using the formula:

$$B_i = k_{bi} \times S_R \times \Delta t_{scan} \tag{2}$$

where $B_i$ represents the distance of the boundary, starting at a sensing device in the first sensing set; $k_{bi}$ represents an adjustable experimental scaling constant for calculating the boundary, and it can be adjusted based on the location of the sensing device and the shape of the moving device; $S_R$ represents the velocity of the moving device; and $\Delta t_{scan}$ represents the environment scan interval of the moving device plus the time taken for the moving device to react to the sensing devices' readings (i.e., measurements).

In an implementation, the determination of whether there is an obstacle in the direction of the initial turning angle corresponding to the sensing device in the first sensing set can include: determining whether there is an obstacle in the direction of the initial turning angle corresponding to the sensing device in the first sensing set by comparing the boundary with the measurement from the sensing device in the first sensing set. In this implementation, it is assumed that the initial turning angle is within the measuring range of the sensing device S1, that is, the initial turning angle corresponds to the sensing device S1. If the boundary $B_i$ is greater than or equal to the measurement from the sensing device S1, the moving device determines that there is an obstacle in the direction of the initial turning angle corresponding to the sensing device S1 in the first sensing set, that is, the object O1 within the boundary $B_i$ is determined as an obstacle in the direction of the initial turning angle between angle A1 and angle A2 corresponding to the sensing device S1; if the boundary $B_i$ is smaller than the measurement from the sensing device S1, the moving device determines that there is no obstacle in the direction of the initial turning angle corresponding to the sensing device S1 in the first sensing set, that is, the object O2 outside the boundary $B_i$ is not determined as an obstacle in the direction of the initial turning angle between angle A1 and angle A2 corresponding to the sensing device S1.

In this implementation, the boundary is used to determine whether an object (i.e., the object O1 or O2) detected by the sensing device may affect the driving (movement) of the moving device. Specifically, if the distance between the detected object and the moving device is greater than or equal to the boundary $B_i$, the moving device can determine that the detected object is far away from the moving device and the presence of the detected object may not affect the driving of the moving device, that is, the detected object can be determined as a non-obstacle; otherwise, the moving device can determine that the presence of the detected object may affect the driving of the moving device, and determine the detected object as an obstacle, and in this case, the moving device needs to avoid the obstacle.

It should be understood that the object detected by the sensing device in the first sensing set mentioned above does not refer to the target, that is, the moving device can recognize which object is the target, no matter the target is within or without the boundary. In addition, it should be understood that a detection result of the sensing device in the first sensing set can be that no object is detected, in this case, the sensing device may also have a measurement, for example, the measurement may be equal to its maximum measuring distance or a default value reflecting the none obstacle case.

Step S203, the moving device obtains an adjusted turning angle of which direction has no obstacle based on a determination of the obstacle in the direction of the initial turning angle.

In the case where the determination indicates an obstacle in the direction of the initial turning angle, the moving device can refine the initial turning angle to obtain the adjusted turning angle of which direction has no obstacle, and then turn by the adjusted turning angle of which direction has no obstacle, thereby obstacle avoidance is achieved, the moving device can continue following the target, and the safety of the moving device is ensured.

In the case of the determination indicates no obstacle in the direction of the initial turning angle, this step of obtaining the adjusted turning angle would be simply to take the initial turning angle as the adjusted turning angle and turn by the adjusted turning angle.

Figure 4:
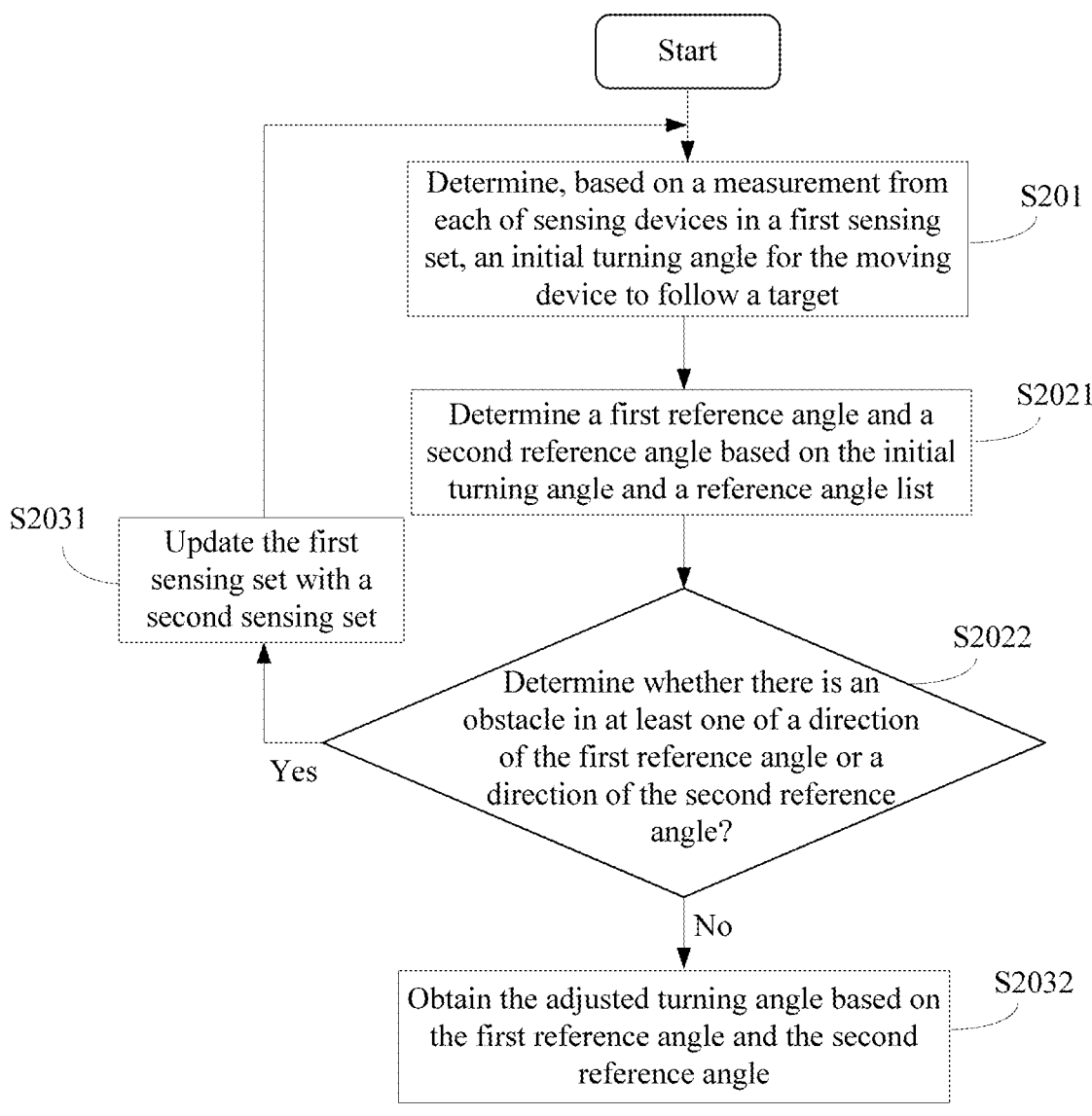
FIG. 4 is a schematic flowchart of another obstacle avoidance method for a moving device according to an embodiment of the present disclosure.

FIG. 4 is a schematic flowchart of another obstacle avoidance method for a moving device according to an embodiment of the present disclosure. In an implementation, step S202 of determining whether there is an obstacle in the direction of the initial turning angle can include:

step S2021, the moving device determines a first reference angle and a second reference angle based on the initial turning angle and a reference angle list; and step S2022, the moving device determines whether there is an obstacle in at least one of a direction of the first reference angle or a direction of the second reference angle.

As discussed with reference to FIG. 3 above, each of the sensing devices in the first sensing set corresponds to a reference angle. In an implementation, the moving device can be informed of or create the reference angle list that is indicative of a reference angle corresponding to each of the sensing devices in the first sensing set. In an implementation, the reference angle list can be created using the direction to which each of the sensing devices in the first sensing set points. For example, the reference angle list can be created in accordance with the following formula:

$$A_{list} = \left[ -\frac{n\pi}{N}, -\frac{(n-1)\pi}{N}, -\frac{(n-2i)\pi}{N}, \ldots, - \right. \tag{3}$$
$$\left. \frac{\pi}{N}, 0, \frac{\pi}{N}, \ldots, \frac{(n-2)\pi}{N}, \frac{(n-1)\pi}{N}, \frac{n\pi}{N} \right]$$

where $A_{list}$ is the reference angle list.

Taking the layout of the sensing devices in the first sensing set shown in FIG. 3 as an example, that is, the number N of the sensing devices in the first sensing set equals to 9, and n equals to 4, the reference angle list $A_{list}$ corresponding to the sensing devices in the first sensing set created in accordance with the formula (3) is $$A_{list} = \left[ -\frac{4\pi}{9}, -\frac{3\pi}{9}, -\frac{2\pi}{9}, -\frac{\pi}{9}, 0, \frac{\pi}{9}, \frac{2\pi}{9}, \frac{3\pi}{9}, \frac{4\pi}{9} \right].$$

That is, the formula (3) means that the sensing devices in the first sensing set are uniformly arranged on the moving device within an angle range between $$-\frac{\pi}{2} \text{ and } \frac{\pi}{2},$$

in other words, the sensing devices in the first sensing set are uniformly arranged in the forward direction of the moving device.

In this implementation, the initial turning angle belongs to an interval formed by the first reference angle and the second reference angle, and no reference angle in the reference angle list falls inside the interval, that is, the initial turning angle is between two adjacent reference angles in the reference angle list, for example, as shown in FIG. 3, the initial turning angle may be angle A between the first reference angle A3 and the second reference angle A4, where the first reference angle A3 is adjacent to the second reference angle A4. Therefore, determining the first reference angle and the second reference angle based on the initial turning angle and the reference angle list means finding two adjacent reference angles between which the initial turning angle falls, that is, finding i such that $A_{list}[i] \leq A < A_{list}[i+1]$, where i represents the i-th sensing device in the first sensing set, $A_{list}[i]$ represents the first reference angle corresponding to the i-th sensing device in the first sensing set, A represents the initial turning angle, and $A_{list}[i+1]$ represents the second reference angle corresponding to the (i+1)-th sensing device in the first sensing set.

In an implementation, step S202 of determining whether there is an obstacle in the direction of the initial turning angle can include: when (i.e., in a case that) the moving device determines that there is an obstacle in at least one of the direction of the first reference angle or the direction of the second reference angle, the moving device determines that there is an obstacle in the direction of the initial turning angle; when (i.e., in a case that) the moving device determines that there is no obstacle in the direction of the first reference angle and the direction of the second reference angle, the moving device determines that there is no obstacle in the direction of the initial turning angle.

In this implementation, step S203 of obtaining the adjusted turning angle of which direction has no obstacle based on the determination of the obstacle in the direction of the initial turning angle can include:

step S2031, upon determining that there is an obstacle in at least one of the direction of the first reference angle or the direction of the second reference angle, the moving device updates the first sensing set with a second sensing set, and repeats the determination of the initial turning angle, the determination of an obstacle in the direction of the initial turning angle and the obtaining of the adjusted turning angle;

step S2032, upon determining that there is no obstacle in the direction of the first reference angle and the direction of the second reference angle, the moving device obtains the adjusted turning angle based on the first reference angle and the second reference angle.

As shown in FIG. 4, in a case that the moving device determines that there is an obstacle in at least one of the direction of the first reference angle or the direction of the second reference angle, the moving device updates the first sensing set with the second sensing set, and repeats the determination of the initial turning angle (S201), the determination of an obstacle in the direction of the initial turning angle (S2021 and S2022) and the obtaining of the adjusted turning angle (S203). The above process may be executed iteratively, that is, when the moving device determines that there is an obstacle in at least one of the direction of the first reference angle or the direction of the second reference angel, the first sensing set in step S201 is replaced with the second sensing set (i.e., in step S201, the moving device determines, based on a measurement from each of sensing devices in the second sensing set, the initial turning angle for the moving device to follow the target), and the moving device repeats steps S201, S2021, S2022, and S2031, until the moving device determines (S2032) that there is no obstacle in both of the direction of the first reference angle and the direction of the second reference angle, and obtains the adjusted turning angle based on the first reference angle and the second reference angle.

In an implementation, the sensing devices in the second sensing set are selected from the sensing devices in the first sensing set (that is, the second sensing set is a subset of the first sensing set, and in other words, the sensing devices in the second sensing set are included in the first sensing set), and reference angles corresponding to the sensing devices in the second sensing set are associated with at least one of the first reference angle or the second reference angle of which direction has an obstacle. That means the reference angles corresponding to the sensing devices in the second sensing set are determined based on the first reference angle if the direction of the first reference angle has an obstacle, or based on the second reference angle if the direction of the second reference angle has an obstacle, or based on both of the first reference angle and the second reference angle if directions of both first and second reference angles have obstacles.

Therefore, according to the embodiments of the present disclosure, the moving device may determine the first reference angle and the second reference angle, and determine whether there is an obstacle in at least one of the direction of the first reference angle or the direction of the second reference angle, upon determining that there is an obstacle in at least one of the direction of the first reference angle or the direction of the second reference angle, the moving device may update the first sensing set with the second sensing set, and repeat the determination of the initial turning angle, the determination of an obstacle in the direction of the initial angle and the obtaining of the adjusted turning angle, until the moving device determines that there is no obstacle in both of the direction of the first reference angle and the direction of the second reference angle, and the moving device may obtain the adjusted turning angle based on the first reference angle and the second reference angle. In this way, the moving device can obtain a more appropriate turning angle (that is, the adjusted turning angle), and the safety of the moving device can be ensured.

In an implementation, the first reference angle is smaller than the second reference angle, when there is an obstacle in the direction of the first reference angle, reference angles corresponding to the sensing devices in the second sensing set are not greater than the first reference angle. In an implementation, the first reference angle is smaller than the second reference angle, when there is an obstacle in the direction of the second reference angle, reference angles corresponding to the sensing devices in the second sensing set are greater than the second reference angle.

As described above referring to FIG. 3, the first reference angle, the initial turning angle, and the second reference angle satisfy the following relationship: $A_{list}[i] \leq A < A_{list}[i+1]$, in this case, the reference angles corresponding to the sensing devices in the second sensing set that are not greater than the first reference angle are from $A_{list}[1]$ to $A_{list}[i]$, that is, the reference angles correspond to the 1-st sensing device to the i-th sensing device in the reference angle list (i.e., in the first sensing set). Similarly, the reference angles corresponding to the sensing devices in the second sensing set that are greater than the second reference angle are from $A_{list}[i+1]$ to $A_{list}[N]$, that is, the reference angels correspond to the (i+1)-th sensing device to the N-th sensing device in the reference angle list (i.e., in the first sensing set).

In an implementation, the first reference angle is smaller than the second reference angle, when there are obstacles in the direction of the first reference angle and the direction of the second reference angel, the moving device randomly determines the reference angles corresponding to the sensing devices in the second sensing set to be not greater than the first reference angle or to be greater than the second reference angle.

In an implementation, the first reference angle is smaller than the second reference angle, when there are obstacles in the direction of the first reference angle and the direction of the second reference angel, the moving device determines the reference angles corresponding to the sensing devices in the second sensing set (referred to as set S') to be not greater than the first reference angle, that is, the set S' is from $A_{list}[1]$ to $A_{list}[i]$, replaces the first sensing set in step S201 with the second sensing set S', performs steps S201, S2021, and S2022, and determines the initial turning angle (referred to as A') obtained based on the set S' of which direction has no obstacle as the first reference angle; and then or at the same time, the moving device determines the reference angles corresponding to the sensing devices in the second sensing set (referred to as set S") to be greater than the second reference angle, that is, the set S" is from $A_{list}[i+1]$ to $A_{list}[N]$, replaces the first sensing set in step S201 with the second sensing set S", performs steps S201, S2021, and S2022, and determines the initial turning angle (referred to as A") obtained based on the set S" of which direction has no obstacle as the second reference angle. After that, the iteration continues until an adjusted turning angle is obtained.

Therefore, according to the embodiments of the present disclosure, the moving device may determine the reference angles corresponding to the sensing devices in the second sensing set by using the angle division method mentioned above, and replace the first sensing set with the second sensing set to obtain the adjusted turning angle. In this way, the moving device can obtain the adjusted turning angle by introducing a more appropriate angle range.

In an implementation, the obstacle avoidance method for the moving device can further include the following steps:

the moving device obtains a current location of the target;

the moving device determines a candidate turning angle based on a current location of the moving device and the current location of the target;

the moving device selects, from the first reference angle and the second reference angle, a reference angle closer to the candidate turning angle as the adjusted turning angle.

In this implementation, the moving device can obtain the current location of the target by a UWB sensor or the like, and determine its current location with a location sensor, or by monitoring its velocity relative to an initial reference point, which are described above and will not be repeated here.

In an implementation, the moving device determines a direction pointing from its current location to the current location of the target or the target location of the moving device as a direction of the candidate turning angle, that is, the direction $D_T$ of the candidate turning angle $A_T$ can be represented by the following expression: $D_T = L_T - L_R$ or $D_T = L_T - L_{R2T}$. It should be understood that the vector $L_T$ and the vector $L_{R2T}$ are in the same direction. Upon determining the direction of the candidate turning angle, the candidate turning angle can be determined according to a reference coordinate system established by the moving device, which will not be described in detail here since it is well known for those skilled in the art. In this implementation, the candidate turning angle refers to the angle that the moving device needs to turn to make the moving device move from its current location $L_R$ to the target location $L_{R2T}$ of the moving device in the shortest distance (that is, in a straight line direction between the current location $L_R$ and the target location $L_{R2T}$ of the moving device) without considering obstacles in this direction.

In this implementation, the step of obtaining the adjusted turning angle based on the first reference angel and the second reference angle can include the step of selecting, from the first reference angle and the second reference angle, the reference angle closer to the candidate turning angle as the adjusted turning angle, that is, either the first reference angle or the second reference angle that enables the moving device to turn at a smaller angle to reach its target location is determined as the adjusted turning angle. The moving device turns by the adjusted turning angle, and thus it can reach its target location faster while avoiding obstacles, thereby ensuring the safety of the moving device while saving power.

FIG. 5 is a schematic flowchart of a process for determining an initial turning angle according to an embodiment of the present disclosure. Referring to FIG. 5, before step S201 of determining, based on the measurement from each of the sensing devices in the first sensing set, the initial turning angle for the moving device to follow the target, the method can further include the steps as follows.

Step S501, the moving device obtains first moving data of the target, where the first moving data of the target includes a current location of the target.

In an implementation, the moving data of the target can further include a velocity of the target, and the moving device can obtain the velocity of the target by UWB positioning technology or other positioning technologies that can obtain the velocity of the target.

Step S502, the moving device determines a moving speed for the moving device to follow the target based on a current location of the moving device and the current location of the target.

In an implementation, step S502 can include:

I, when a distance between the current location of the moving device and the current location of the target does not meet a predefined requirement, the moving device determines the moving speed to be logarithmically proportional to a distance derived from the current location of the moving device and the current location of the target;

II, when a distance between the current location of the moving device and the current location of the target meets a predefined requirement, the moving device determines the moving speed as the current speed of the target.

In this implementation, the predefined requirement can be that the moving device currently reaches the target location $L_{R2T}$, that is, the current location $L_R$ of the moving device is at the target location $L_{R2T}$ of the moving device, and the distance between the target location of the moving device and the current location of the target is equal to a pre-set threshold (i.e., $k_L$ mentioned above). Therefore, the predefined requirement can be represented by the following equation: $L_T - L_R = k_L$.

In part I of S502, in a case that the distance between the current location of the moving device and the current location of the target does not meet the predefined requirement, that is, the moving device has not reached the target location $L_{R2T}$, the moving device can move faster to reach the target location, and therefore the moving device can determine the moving speed for the moving device to follow the target to be logarithmically proportional to the distance derived from the current location of the moving device and the current location of the target. In an implementation, the moving speed $S_R$ for the moving device to follow the target can be determined in accordance with the following equation:

$$S_R = k_s \ln\left(\left|L_{R2T} - L_R\right| + 1\right) \tag{4}$$

where $k_s$ represents an adjustable experimental constant for calculating the moving speed for the moving device to follow the target. As described above, the target location of the moving device $L_{R2T}$ is derived from the current location of the moving device and the current location of the target.

In step S502, in a case that the distance between the current location of the moving device and the current location of the target meets the predefined requirement, that is, the moving device has reached the target location of the moving device, and therefore the moving device can determine the moving speed for following the target as the current speed of the target, that is, the magnitude and the direction of the moving speed for the moving device to follow the target is the same as those of the current speed of the target.

Step S503, for each of the sensing devices in the first sensing set, the moving device determines whether there is an obstacle in the measuring range of the sensing device based on the measurement from the sensing device and the moving speed.

In an implementation, referring to the description related to step S202 above, for each of the sensing devices in the first sensing set, the moving device can determine, for each of the sensing devices in the first sensing set, whether there is an obstacle in a direction of an angle corresponding to the sensing device by comparing the boundary $B_i$ with the measurement from the sensing device, that is, the moving device can determine whether there is an obstacle in the measuring range of the sensing device based on the measurement from the sensing device and the boundary $B_i$ that can be determined according to the moving speed, which will not be repeated here.

In an implementation, step S201 of determining, based on the measurement from each of the sensing devices in the first sensing set, the initial turning angle for the moving device to follow the target can include:

Step S504, the moving device determines the initial turning angle based on a result of the determination of the obstacle in the measuring range of the sensing device.

In an implementation, step S504 can include: when there is an obstacle in the measuring range of at least one of the sensing devices in the first sensing set, the moving device determines the initial turning angle based on the measurement from each of the sensing devices in the first sensing set and a reference angle list, where the reference angle list is indicative of a reference angle corresponding to each of the sensing devices in the first sensing set.

In this implementation, the moving device determines the initial turning angle based on the first sensing set and the reference angle list upon determining there is an obstacle in the measuring range of at least one of the sensing devices in the first sensing list, where the reference angle list has been described regarding step S2021, which will not be repeated here.

In an implementation, the step of determining the initial turning angle based on the measurement from each of the sensing devices in the first sensing set and the reference angle list can include the following steps:

I, the moving device calculates a weighted sum of measurements from the sensing devices based on the reference angle list and the measurements;

II, the moving device determines the initial turning angle of the moving device based on the weighted sum of the measurements.

In an implementation, the weighted sum $W_{sum}$ of the measurements from the sensing devices can be calculated in accordance with the following equation:

$$W_{sum} = \sum_{i=x}^{y} A_{list}[i] \times D_i \tag{5}$$

where i is a positive integer; y is the number of the sensing devices; $A_{list}[i]$ is a reference angle list corresponding to the i-th sensing device; and $D_i$ is a measurement corresponding to the i-th sensing device.

In an implementation, the initial turning angle of the moving device can be determined in accordance with the following equations:

$$A = \frac{W_{sum}}{D_{sum}} \tag{6}$$

$$D_{sum} = \sum_{i=x}^{y} D_i \tag{7}$$

where A represents the initial turning angle of the moving device; $D_{sum}$ represents the sum of measurements from the sensing devices, i is a positive integer, and y is the number of the sensing devices.

It should be understood that the sensing devices are arranged in the forward direction of the moving device, that is, the sensing devices are arranged in the direction between $$-\frac{\pi}{2} \text{ and } \frac{\pi}{2},$$

and thus the positive or negative sign of the calculated initial turning angle A represents the turning direction of the moving device, for example, if the sign of the calculated initial turning angle is positive, a reasonable choice for the moving device may be to turn right, or if the sign of the calculated initial turning angle is negative, the moving device may turn left. By deciding the initial turning angle determined in accordance with equation (6), the initial determination of the turning for the moving device may be to turn to the side with fewer obstacles. After that, the refinement of the initial turning angle may be done as described with reference to FIG. 1 if there is an obstacle in the direction of the initial turning angle.

It should be understood that in step S201 shown in FIG. 1, the weighted sum and the sum of the measurements are calculated based on the measurements from all of the sensing devices in the first sensing set, that is, the number of the sensing devices whose measurements serve as the basis for the calculation of the weighted sum and the sum of the measurements is the number N of the sensing devices in the first sensing set, or in other words, the first determination of the initial turning angle is based on the measurements from all the sensing devices in the first sensing set; and in step S201 shown in FIG. 4, since the first sensing set is updated with the second sensing set, the number of the sensing devices whose measurements serve as the basis for the calculation of the weighted sum and the sum of the measurements is the number of the sensing devices in the second sensing set, that is, in each iteration, the determination of the initial turning angle is determined based on the measurements from sensing devices in the updated sensing set.

In an implementation, when there is an obstacle in the direction of the initial turning angle, the moving device follows the target based on the adjusted turning angle, and a duration of the following of the target is based on a predefined scan interval and a time taken for the moving device to react to the measurement from each of the at least one sensing device in the first sensing set.

In an implementation, for each of the sensing devices in the first sensing set, when there is no obstacle in the measuring range of each of the sensing devices in the first sensing set (that is, in a case that there is no obstacle in the measuring range of each of the sensing devices in the first sensing set), for example, all of the measurements from the sensing devices in the first sensing set are their maximum measuring distances or default values reflecting the none obstacle case, that is, there is no obstacle in all directions, so as describe above, the step S203 of obtaining the adjusted turning angle would be simply to take the initial turning angle as the adjusted turning angle. In this case, the determination of the initial turning angle would be similar to the above described determination of the candidate turning angle $A_T$. In this implementation, a duration of the following of the target can also be based on a predefined scan interval and a time taken for the moving device to react to the measurement from each of the at least one sensing device in the first sensing set.

Therefore, according to the embodiments of the present disclosure, the moving device may first obtain the current location of the target and determine the moving speed for the moving device to follow the target based on the obtained current location of the target, then the moving device may determine the initial turning angle in different ways depending on whether there is an obstacle or not in the measuring range of at least one of the sensing devices in the first sensing set, and perform refinement on the determined initial turning angle if there is an obstacle in the direction of the initial turning angle to turn by the adjusted turning angle and follow the target, or the moving device would directly follow the target with the initial turning angle if there is no obstacle in the direction of the initial turning angle. In this way, the effective tracking of the target is achieved.

Figure 6:
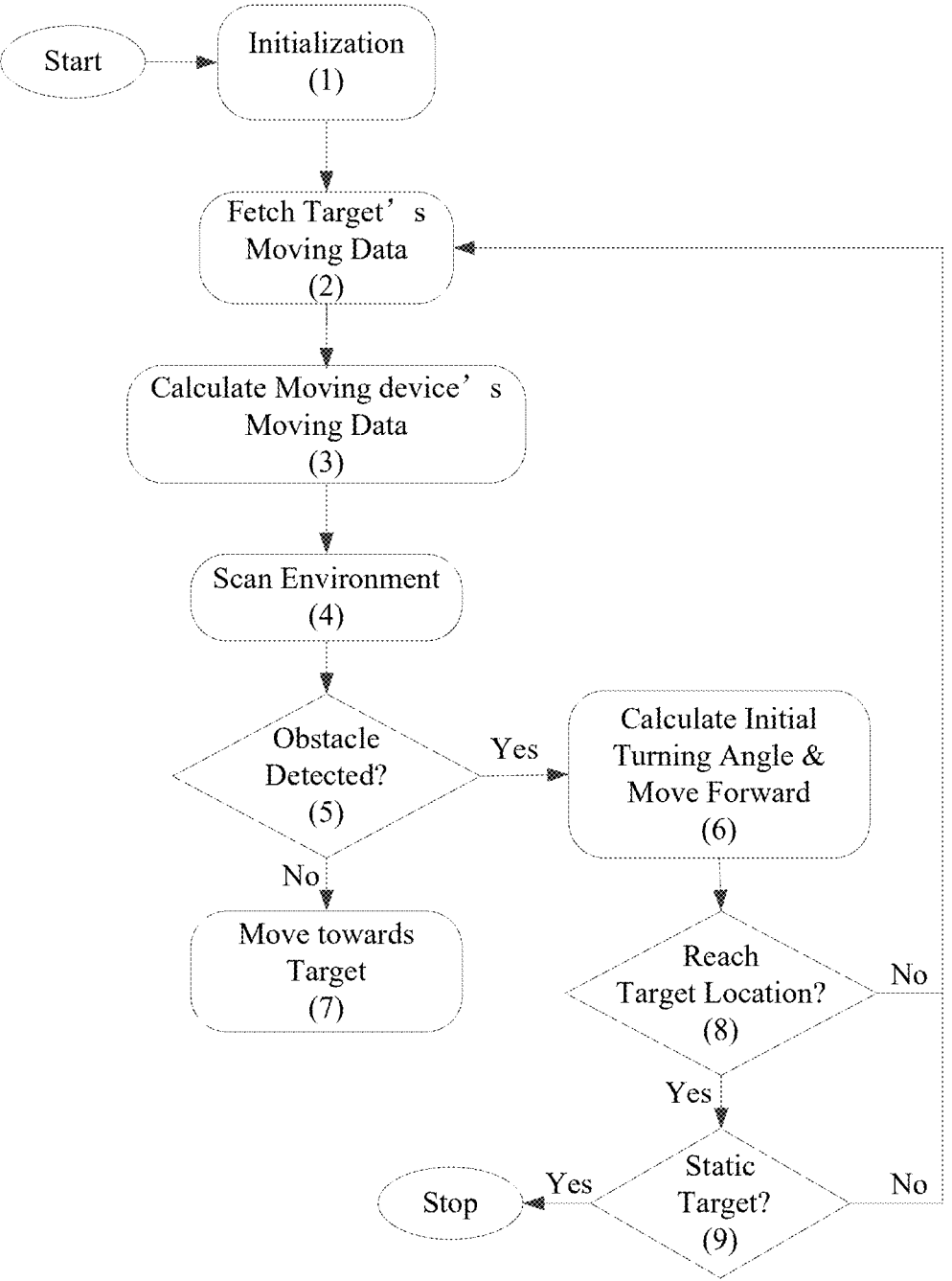
FIG. 6 is a schematic flowchart of a specific example of an obstacle avoidance method for a moving device according to an embodiment of the present disclosure.

In order to describe the obstacle avoidance method for the moving device mentioned above, a specific example is provided with reference to FIG. 6, which is a schematic flowchart of a specific example of an obstacle avoidance method for a moving device according to an embodiment of the present disclosure.

1. Initialization

In step 1, the moving device can perform initialization of some parameters, for example, the moving device can create the reference angle list $A_{list}$ using the direction each sensing device in the first sensing set points to in accordance with equation (3) mentioned above, which will not be repeated here.

2. Fetch Target's Moving Data

In step 2, the moving device can obtain the current location $L_T$ of the target and the velocity $V_T$ of the target. The way to obtain the current location and velocity of the target is described with reference to FIG. 1, which will not be repeated here.

3. Calculate Moving Device's Moving Data

In step 3, the moving device can obtain its moving data, and the moving data including: (1) its current location $L_R$ and target location $L_{R2T}$ (the location where the moving device moves to), for the ways of obtaining the current location $L_R$ and the target location $L_{R2T}$ of the moving device, reference can be made to the description of FIG. 1; (2) the candidate turning angle, which can be determined based on the current location of the moving device and the current location of the target; (3) the moving speed $S_R$ for the moving device to follow the target, which can be determined based on the current location of the moving device and the current location of the target, and for the ways of determining the moving speed for the moving device to follow the target, reference can be made to the description related to step S502 which will not be repeated here.

4. Scan Environment

In this step, the moving device can save the measurement $D_i$ from each of the sensing devices in the first sensing set.

5. Obstacle Detection

In this step, the moving device can perform obstacle detection based on the comparison between the boundary $B_i$ and the measurements from each of the sensing devices in the first sensing set, that is, in this step, the moving device can determine, for each of the sensing devices in the first sensing set, whether there is an obstacle in the measuring range of the sensing device based on the measurement from the sensing device and the moving speed, which can be referred to the description of FIG. 3 and step S503 and will not be repeated here.

6. Calculate Initial Turning Angle & Move Forward

If the moving device determines, for each of the sensing devices in the first sensing set, there is an obstacle in the measuring range of the sensing device based on the measurement from the sensing device and the moving speed in step 5, the moving device can determine the initial turning angle based on the measurement from each of the sensing device in the first sensing set and the reference angle list, which can be referred to the above described parts I and II for determination of the initial turning angle based on the measurement from each of the sensing devices in the first sensing set and the reference angle list, and will not be repeated here.

In this step, if the moving device determines there is an obstacle in the direction of the initial turning angle, the moving device can obtain the adjusted turning angle of which direction has no obstacle based on the determination of the obstacle in the direction of the initial turning angle, which can be referred to the description related to steps S202 and S203 (including the description related to steps S2021, S2022, S2031, and S2032, the above described parts I and II for determination of the initial turning angle based on the measurement from each of the sensing devices in the first sensing set and the reference angle list, and the like).

After determining the adjusted turning angle, the moving device can turn by the adjusted turning angle and move forward at the moving speed $S_R$ determined in step 3 by time $\Delta t_{move}$, which can be determined based on the predefined scan interval and the time taken for the moving device to react to the measurement from each of the at least one sensing device in the first sensing set.

7. Move Towards Target

In this step, if the moving device determines, for each of the sensing devices in the first sensing set, there is no obstacle in the measuring range of each of the sensing devices in the first sensing set, that is, there is no obstacle in all directions in which the sensing devices in the first sensing set measure, the moving device can take the initial turning angle as the adjusted turning angle, in this case, the determination of the initial turning angle would be similar to the above described determination of the candidate turning angle $A_T$, and then turn by the candidate turning angle, and move forward at the moving speed $S_R$ determined in step 3 by time $\Delta t_{move}$, which can be determined based on the predefined scan interval and the time taken for the moving device to react to the measurement from each of the at least one sensing device in the first sensing set.

8. Check if the Moving Device has Reached the Target Location $L_{R2T}$ of the Moving Device In this step, the moving device can check if it has reached the target location $L_{R2T}$ after moving forward at the moving speed $S_R$ by time $\Delta t_{move}$ in step 6 or 7. If the moving device determines that it has reached the target location $L_{R2T}$, it can execute step 9; otherwise, it can return to step 2.

It should be noted that if the moving device determines in step 3 that the distance between the current location of the moving device and the current location of the target meets the predefined requirements (that is, the moving device has reached the target location of the moving device, which can be referred to part II of step S502), there is no need for the moving device to execute step 8.

9. Check if the Target is Static

If the moving device determines that it has reached the target location $L_{R2T}$ in step 8, the moving device can determine whether the target is static, that is, velocity $V_T$ of the target is zero. In a case that the moving device determines that it has reached the target location and the target is static, the moving device can stop; in a case that the moving device determines that it has has reached the target location and the target is not static (that is, the target is dynamic), it can return to step 2.

Figure 7:
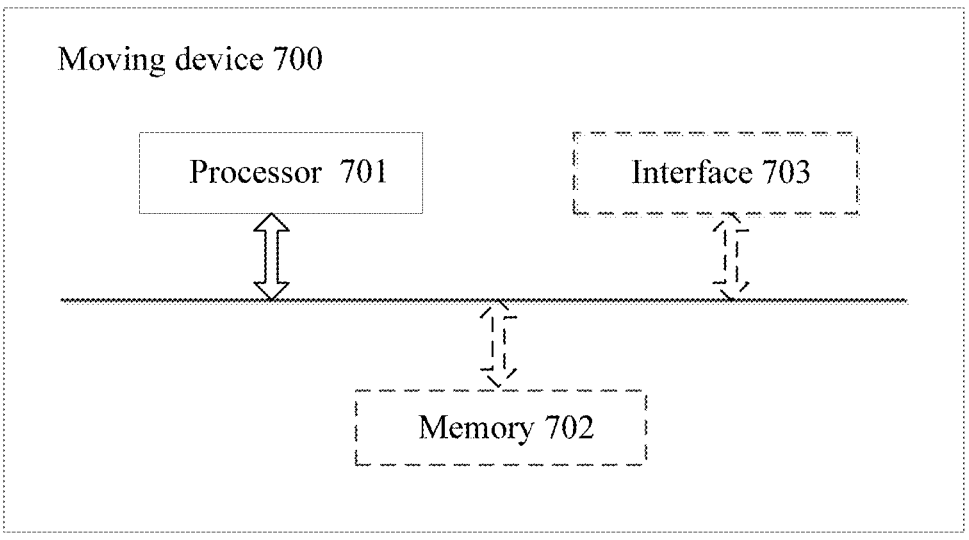
FIG. 7 is a schematic structural diagram of a moving device according to an embodiment of the present disclosure.

FIG. 7 is a schematic structural diagram of a moving device according to an embodiment of the present disclosure. The moving device can be applied to the scenario shown in FIG. 1 and used to perform the obstacle avoidance method mentioned above. As shown in FIG. 7, the moving device 700 can include a processor 701, or in some implementation further includes a memory 702. In an implementation, the moving device 700 can further include an interface 703 for communicating with other devices (for example, communicating with a target by a UWB label set on the target). The memory 702 may be stored with instructions. In an implementation, the memory 702 may be a memory externally connected to the processor 701, a cloud storage in the cloud, or other memories that can exchange data with the processor 701.

Figure 8:
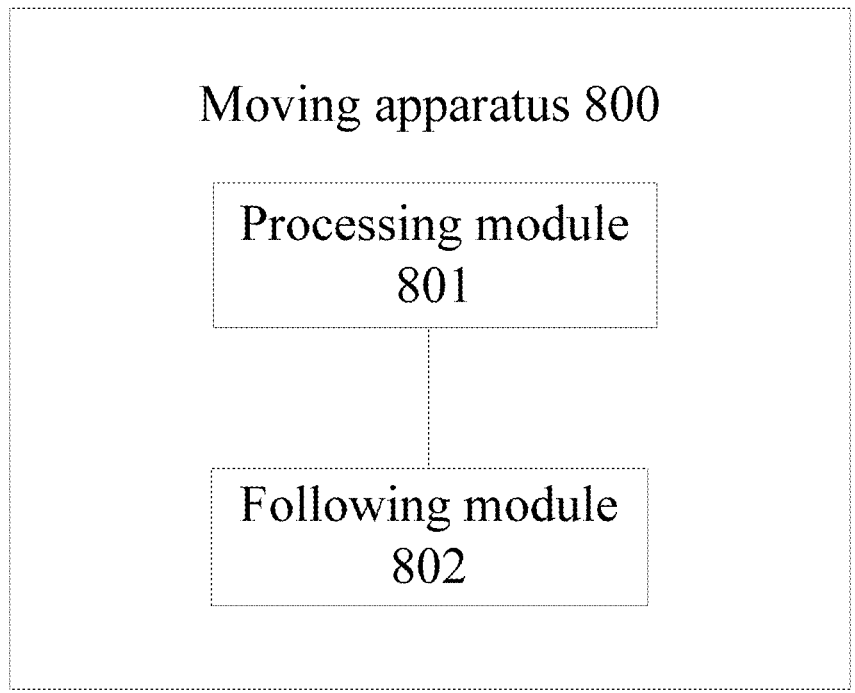
FIG. 8 is a schematic structural diagram of a moving apparatus according to an embodiment of the present disclosure.

FIG. 8 is a schematic structural diagram of a moving apparatus according to an embodiment of the present disclosure, which can be applied in the scenario shown in FIG.

1 and used to perform the obstacle avoidance method mentioned above. The moving apparatus 800 includes:

a processing module 801, configured to:

determine, based on a measurement from each of sensing devices in a first sensing set, an initial turning angle for the moving apparatus 800 to follow a target, where each of the sensing devices is operatively coupled to the moving apparatus 800, and the measurement is indicative of information of at least one object within a measuring range of each of the sensing devices;

determine whether there is an obstacle in a direction of the initial turning angle; and obtain an adjusted turning angle of which direction has no obstacle based on a determination of the obstacle in the direction of the initial turning angle.

In an implementation, the sensing devices in the first sensing set can be integrated into the moving apparatus 800, or communicatively connected to the moving apparatus 800.

In an implementation, the processing module 801 is further configured to:

determine a first reference angle and a second reference angle based on the initial turning angle and a reference angle list, where the reference angle list is indicative of a reference angle corresponding to each of the sensing devices in the first sensing set, where the initial turning angle belongs to an interval formed by the first reference angle and the second reference angle, and no reference angle in the reference angle list falls inside the interval;

determine whether there is an obstacle in at least one of a direction of the first reference angle or a direction of the second reference angle;

upon determining that there is an obstacle in at least one of the direction of the first reference angle or the direction of the second reference angle, update the first sensing set with a second sensing set, and repeat the determination of the initial turning angle, the determination of an obstacle in the direction of the initial turning angle, and the obtaining of the adjusted turning angle, where sensing devices in the second sensing set are selected from the sensing devices in the first sensing set, and reference angles corresponding to the sensing devices in the second sensing set are associated with at least one of the first reference angle or the second reference angle of which direction has an obstacle;

upon determining that there is no obstacle in the direction of the first reference angle and the direction of the second reference angle, obtain the adjusted turning angle based on the first reference angle and the second reference angle.

In an implementation, the processing module 801 is further configured to:

obtain a current location of the target;

determine a candidate turning angle based on a current location of the moving device and the current location of the target;

upon determining that there is no obstacle in the direction of the first reference angle and the direction of the second reference angle, select, from the first reference angle and the second reference angle, a reference angle closer to the candidate turning angle as the adjusted turning angle.

In an implementation, the first reference angle is smaller than the second reference angle, and when there is an obstacle in the direction of the first reference angle, reference angles corresponding to the sensing devices in the second sensing set are not greater than the first reference angle.

In an implementation, the first reference angle is smaller than the second reference angle; and when there is an obstacle in the direction of the second reference angle, reference angles corresponding to the sensing devices in the second sensing set are greater than the second reference angle.

In an implementation, the processing module 801 is further configured to:

obtain first moving data of the target, where the first moving data of the target includes a current location of the target;

determine a moving speed for the moving device to follow the target based on a current location of the moving device and the current location of the target;

for each of the sensing devices in the first sensing set, determine whether there is an obstacle in the measuring range of the sensing device based on the measurement from the sensing device and the moving speed;

determine the initial turning angle based on a result of the determination of the obstacle in the measuring range of the sensing device.

In an implementation, the processing module 801 is further configured to:

when there is an obstacle in the measuring range of at least one of the sensing devices in the first sensing set, determine the initial turning angle based on the measurement from each of the sensing devices in the first sensing set and a reference angle list, where the reference angle list is indicative of a reference angle corresponding to each of the sensing devices in the first sensing set.

In an implementation, the processing module 801 is further configured to:

calculate a weighted sum of measurements from the sensing devices based on the reference angle list and the measurements;

determine the initial turning angle of the moving device based on the weighted sum of the measurements.

In an implementation, the processing module 801 is further configured to:

when a distance between the current location of the moving device and the current location of the target does not meet a predefined requirement, determine the moving speed to be logarithmically proportional to a distance derived from the current location of the moving device and the current location of the target;

when a distance between the current location of the moving device and the current location of the target meets a predefined requirement, determine the moving speed as the current speed of the target.

In an implementation, the first moving data of the target further includes a current speed of the target, the moving apparatus 800 further includes a following module 802, and the following module 802 is further configured to:

when there is an obstacle in the direction of the initial turning angle, follow the target based on the adjusted turning angle; where a duration of the following of the target is based on a predefined scan interval and a time taken for the moving device to react to the measurement from each of the at least one sensing device in the first sensing set.

The moving apparatus may be used for implementing steps described in the above method embodiments. It should be understood by a person skilled in the art that, the relevant description of the above modules in the embodiments of the present disclosure may be understood with reference to the relevant description of the obstacle avoidance method in the embodiments of the present disclosure.

The present disclosure further provides a non-transitory computer-readable storage medium, which stores therein computer-executable instructions which, when being executed by one or more processors, implement the obstacle avoidance method according to embodiments of the present disclosure.

The present disclosure further provides a computer program, when the computer program is executed by one or more processors, implements the obstacle avoidance method according to embodiments of the present disclosure.

The present disclosure further provides a computer program product, which stores thereon computer-executable instructions which, when being executed by one or more processors, implements the obstacle avoidance method according to embodiments of the present disclosure.

In one or more examples, the functions described may be implemented in hardware, software, firmware, or any combination thereof. For example, the functions may be implemented by one or more processors, such as one or more application-specific integrated circuits (ASICs), field programmable logic arrays (FPGAs), or other equivalent integrated or discrete logic circuitry. Accordingly, the term "processor," as used herein may refer to any of the foregoing structures or any other structure suitable for the implementation of the techniques described herein. In addition, the techniques could be fully implemented in one or more circuits or logic elements.

Of course, the devices and components shown in the drawings may include further elements that are not shown in the drawings. The functions of the foreign object moving apparatus described in the specification can be realized by a circuit, which includes a sub-circuit or a combination of a plurality of sub-circuits, that is, the modules (the processing module and the following module) described in the specification can be implemented as a sub-circuit or a combination of a plurality of sub-circuits.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. Those embodiments with various modifications are within the range and scope of the following claims.

What is claimed is:

1. An obstacle avoidance method for a moving device, comprising:

determining, based on a measurement from each of sensing devices in a first sensing set, an initial turning angle for the moving device to follow a target, wherein each of the sensing devices is operatively coupled to the moving device, and the measurement is indicative of information of at least one object within a measuring range of each of the sensing devices;

determining whether there is an obstacle in a direction of the initial turning angle;

obtaining an adjusted turning angle of which direction has no obstacle based on a determination of the obstacle in the direction of the initial turning angle; and when there is an obstacle in the direction of the initial turning angle, following the target based on the adjusted turning angle, wherein a duration of the following of the target is based on a predefined scan interval and a time taken for the moving device to react to the measurement from each of the at least one sensing device in the first sensing set.

2. The obstacle avoidance method according to claim 1, wherein determining whether there is an obstacle in the direction of the initial turning angle comprises:

determining a first reference angle and a second reference angle based on the initial turning angle and a reference angle list, wherein the reference angle list is indicative of a reference angle corresponding to each of the sensing devices in the first sensing set, wherein the initial turning angle belongs to an interval formed by the first reference angle and the second reference angle, and no reference angle in the reference angle list falls inside the interval;

determining whether there is an obstacle in at least one of a direction of the first reference angle or a direction of the second reference angle;

wherein obtaining the adjusted turning angle of which direction has no obstacle based on the determination of the obstacle in the direction of the initial turning angle comprises:

upon determining that there is an obstacle in at least one of the direction of the first reference angle or the direction of the second reference angle, updating the first sensing set with a second sensing set, and repeating the determination of the initial turning angle, the determination of an obstacle in the direction of the initial turning angle and the obtaining of the adjusted turning angle, wherein sensing devices in the second sensing set are selected from the sensing devices in the first sensing set, and reference angles corresponding to the sensing devices in the second sensing set are associated with at least one of the first reference angle or the second reference angle of which direction has an obstacle;

upon determining that there is no obstacle in the direction of the first reference angle and the direction of the second reference angle, obtaining the adjusted turning angle based on the first reference angle and the second reference angle.

3. The obstacle avoidance method according to claim 2, further comprising:

obtaining a current location of the target;

determining a candidate turning angle based on a current location of the moving device and the current location of the target;

wherein obtaining the adjusted turning angle based on the first reference angle and the second reference angle comprises:

selecting, from the first reference angle and the second reference angle, a reference angle closer to the candidate turning angle as the adjusted turning angle.

4. The obstacle avoidance method according to claim 2, wherein the first reference angle is smaller than the second reference angle; and when there is an obstacle in the direction of the first reference angle, reference angles corresponding to the sensing devices in the second sensing set are not greater than the first reference angle.

5. The obstacle avoidance method according to claim 2, wherein the first reference angle is smaller than the second reference angle; and when there is an obstacle in the direction of the second reference angle, reference angles corresponding to the sensing devices in the second sensing set are greater than the second reference angle.

6. The obstacle avoidance method according to claim 1, before determining, based on the measurement from each of the sensing devices in the first sensing set, the initial turning angle for the moving device to follow the target, the method further comprising:

obtaining first moving data of the target, wherein the first moving data of the target comprises a current location of the target;

determining a moving speed for the moving device to follow the target based on a current location of the moving device and the current location of the target; and for each of the sensing devices in the first sensing set, determining whether there is an obstacle in the measuring range of the sensing device based on the measurement from the sensing device and the moving speed;

wherein determining, based on the measurement from each of the sensing devices in the first sensing set, the initial turning angle for the moving device to follow the target comprises:

determining the initial turning angle based on a result of the determination of the obstacle in the measuring range of the sensing device.

7. The obstacle avoidance method according to claim 6, wherein determining the initial turning angle based on the result of the determination of the obstacle in the measuring range of the sensing device comprises:

when there is an obstacle in the measuring range of at least one of the sensing devices in the first sensing set, determining the initial turning angle based on the measurement from each of the sensing devices in the first sensing set and a reference angle list, wherein the reference angle list is indicative of a reference angle corresponding to each of the sensing devices in the first sensing set.

8. The obstacle avoidance method according to claim 7, wherein determining the initial turning angle based on the measurement from each of the sensing devices in the first sensing set and the reference angle list comprises:

calculating a weighted sum of measurements from the sensing devices based on the reference angle list and the measurements; and determining the initial turning angle of the moving device based on the weighted sum of the measurements.

9. The obstacle avoidance method according to claim 6, wherein the first moving data of the target further comprises a current speed of the target;

wherein determining the moving speed for the moving device to follow the target based on the current location of the moving device and the current location of the target comprises:

when a distance between the current location of the moving device and the current location of the target does not meet a predefined requirement, determining the moving speed to be logarithmically proportional to a distance derived from the current location of the moving device and the current location of the target; and when a distance between the current location of the moving device and the current location of the target meets a predefined requirement, determining the moving speed as the current speed of the target.

10. A moving device, comprising:

a processor and a memory stored with instructions, wherein the processor is configured to call and run the instructions stored in the memory to execute operations of:

determining, based on a measurement from each of sensing devices in a first sensing set, an initial turning angle for the moving device to follow a target, wherein each of the sensing devices is operatively coupled to the moving device, and the measurement is indicative of information of at least one object within a measuring range of each of the sensing devices;

determining whether there is an obstacle in a direction of the initial turning angle; and obtaining an adjusted turning angle of which direction has no obstacle based on a determination of the obstacle in the direction of the initial turning angle;

wherein the processor is further configured to call and run the instructions stored in the memory to execute operations of:

when there is an obstacle in the direction of the initial turning angle, following the target based on the adjusted turning angle; and wherein a duration of the following of the target is based on a predefined scan interval and a time taken for the moving device to react to the measurement from each of the at least one sensing device in the first sensing set.

11. The moving device according to claim 10, wherein the processor is further configured to call and run the instructions stored in the memory to execute operations of:

determining a first reference angle and a second reference angle based on the initial turning angle and a reference angle list, wherein the reference angle list is indicative of a reference angle corresponding to each of the sensing devices in the first sensing set, wherein the initial turning angle belongs to an interval formed by the first reference angle and the second reference angle, and no reference angle in the reference angle list falls inside the interval;

determining whether there is an obstacle in at least one of a direction of the first reference angle or a direction of the second reference angle;

upon determining that there is an obstacle in at least one of the direction of the first reference angle or the direction of the second reference angle, updating the first sensing set with a second sensing set, and repeating the determination of the initial turning angle, the determination of an obstacle in the direction of the initial turning angle and the obtaining of the adjusted turning angle, wherein sensing devices in the second sensing set are selected from the sensing devices in the first sensing set, and reference angles corresponding to the sensing devices in the second sensing set are associated with at least one of the first reference angle or the second reference angle of which direction has an obstacle; and upon determining that there is no obstacle in the direction of the first reference angle and the direction of the second reference angle, obtaining the adjusted turning angle based on the first reference angle and the second reference angle.

12. The moving device according to claim 11, wherein the processor is further configured to call and run the instructions stored in the memory to execute operations of:

obtaining a current location of the target;

determining a candidate turning angle based on a current location of the moving device and the current location of the target; and upon determining that there is no obstacle in the direction of the first reference angle and the direction of the second reference angle, selecting, from the first reference angle and the second reference angle, a reference angle closer to the candidate turning angle as the adjusted turning angle.

13. The moving device according to claim 11, wherein the first reference angle is smaller than the second reference angle; and when there is an obstacle in the direction of the first reference angle, reference angles corresponding to the sensing devices in the second sensing set are not greater than the first reference angle.

14. The moving device according to claim 11, wherein the first reference angle is smaller than the second reference angle; and when there is an obstacle in the direction of the second reference angle, reference angles corresponding to the sensing devices in the second sensing set are greater than the second reference angle.

15. The moving device according to claim 10, wherein the processor is further configured to call and run the instructions stored in the memory to execute operations of:

obtaining first moving data of the target, wherein the first moving data of the target comprises a current location of the target;

determining a moving speed for the moving device to follow the target based on a current location of the moving device and the current location of the target;

for each of the sensing devices in the first sensing set, determining whether there is an obstacle in the measuring range of the sensing device based on the measurement from the sensing device and the moving speed; and determining the initial turning angle based on a result of the determination of the obstacle in the measuring range of the sensing device.

16. The moving device according to claim 15, wherein the processor is further configured to call and run the instructions stored in the memory to execute operations of:

when there is an obstacle in the measuring range of at least one of the sensing devices in the first sensing set, determining the initial turning angle based on the measurement from each of the sensing devices in the first sensing set and a reference angle list, wherein the reference angle list is indicative of a reference angle corresponding to each of the sensing devices in the first sensing set.

17. The moving device according to claim 16, wherein the processor is further configured to call and run the instructions stored in the memory to execute operations of:

calculating a weighted sum of measurements from the sensing devices based on the reference angle list and the measurements; and determining the initial turning angle of the moving device based on the weighted sum of the measurements.

18. The moving device according to claim 15, wherein the first moving data of the target further comprises a current speed of the target, and the processor is further configured to call and run the instructions stored in the memory to execute operations of:

when a distance between the current location of the moving device and the current location of the target does not meet a predefined requirement, determining the moving speed to be logarithmically proportional to a distance derived from the current location of the moving device and the current location of the target; and when a distance between the current location of the moving device and the current location of the target meets a predefined requirement, determining the moving speed as the current speed of the target.

* * * * *